United States Patent
Shental et al.

(10) Patent No.: US 8,942,321 B2
(45) Date of Patent: Jan. 27, 2015

(54) EFFICIENT COMPRESSED SENSING CHANNEL ESTIMATION FOR SINGLE-CARRIER COMMUNICATION SYSTEMS

(75) Inventors: Ori Shental, San Diego, CA (US); Alecsander P. Eitan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 851 days.

(21) Appl. No.: 12/888,254

(22) Filed: Sep. 22, 2010

(65) Prior Publication Data

US 2012/0069914 A1    Mar. 22, 2012

(51) Int. Cl.
*H04L 27/06*  (2006.01)
*H04L 1/02*   (2006.01)
*H03D 1/04*   (2006.01)
*H04L 25/02*  (2006.01)

(52) U.S. Cl.
CPC .......... *H04L 25/0248* (2013.01); *H04L 25/0228* (2013.01)
USPC ............ 375/340; 375/346; 375/347; 375/316

(58) Field of Classification Search
USPC ......... 375/219, 220, 222, 295, 316, 324, 340, 375/341, 346, 347, 350, 285, 284
See application file for complete search history.

(56) References Cited

U.S. PATENT DOCUMENTS

| | | | |
|---|---|---|---|
| 8,320,489 B2* | 11/2012 | Bajwa et al. | 375/267 |
| 2004/0233839 A1* | 11/2004 | Troulis | 370/210 |
| 2005/0169350 A1* | 8/2005 | Schilling et al. | 375/142 |
| 2006/0182070 A1* | 8/2006 | Pan et al. | 370/335 |
| 2007/0253514 A1* | 11/2007 | Guevorkian et al. | 375/350 |
| 2010/0067620 A1* | 3/2010 | Reznik et al. | 375/340 |
| 2010/0091895 A1* | 4/2010 | Maltsev et al. | 375/260 |

FOREIGN PATENT DOCUMENTS

EP    2003833 A1 * 12/2008

OTHER PUBLICATIONS

Burg A., et al., "Regularized Frequency Domain Equalization Algorithm and its VLSI Implementation", Circuits and Systems, 2007. ISCAS 2007. IEEE International Symposium 0 N, IEEE, Pl. May 1, 2007, pp. 3530-3533, XP031182068, DOI: 10.1109/ISCAS.2007. 378444 ISBN: 978-1-4244-0920-4 abstract p. 3530-p. 3531.

(Continued)

*Primary Examiner* — Sam K Ahn
*Assistant Examiner* — Linda Wong
(74) *Attorney, Agent, or Firm* — Fulbright & Jaworski LLP (57) ABSTRACT

Methods and devices for receiving wireless signals employ compressed sensing-based estimation techniques to receive single-carrier transmissions, exploiting the common sparseness of the wireless channel, enabling signal reception in the presence of significant Delay and Doppler spreads. When implemented for an ATSC or ATSC-M/H mobile TV standard signal, the compressed sensing channel estimation algorithm enables data reception in Delay and Doppler spread conditions beyond the capabilities of conventional channel estimation methods.

20 Claims, 3 Drawing Sheets

(56) References Cited

OTHER PUBLICATIONS

Figueiredo, M. et al., "Gradient Projection for Sparse Reconstruction: Application to Compressed Sensing and Other Inverse Problems" IEEE Journal of Selected Topics in Signal Processing, IEEE, US, vol. 1, No. 4, Dec. 1, 2007, pp. 586-597, XP011199163.

International Search Report and Written Opinion—PCT/US2011/052190—ISA/EPO—Dec. 6, 2011.

Paredes, J.L. et al., "Ultra-Wideband Compressed Sensing: Channel Estimation", IEEE Journal of Selected Topics in Signal Processing, IEEE, US, vol. 1, No. 3, Oct. 1, 2007, pp. 383-395, XP011193162, ISSN: 1932-4553, DOI: DOI:10.1109/JSTSP.2007.906657.

* cited by examiner

EFFICIENT COMPRESSED SENSING CHANNEL ESTIMATION FOR SINGLE-CARRIER COMMUNICATION SYSTEMS

BACKGROUND

Most broadcast communication systems are vulnerable to interference and fading in reception conditions involving multiple reception paths (i.e., multipath conditions) and significant Doppler shifts. As mobile wireless receivers, such as mobile TV receivers, are implemented in motor vehicles and aircraft, the challenges to signal reception posed by significant Doppler spread are expected to become a significant design challenge.

SUMMARY

The various embodiments make use of compressed sensing/sampling (CS) analysis to accomplish channel estimation to accomplish the challenging task of estimating sparse channels on single-carrier networks. A channel is sparse when the absolute value of only a small fraction of the channel taps actually exceeds a certain low threshold, while the rest of the taps are equal or very close to zero. The various embodiments implement CS algorithms so as to reconstruct signals from a reduced set of linear measurements utilizing the side information that the signal is sparse or compressible.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any embodiment described herein as "exemplary" is not necessarily to be construed as preferred or advantageous over other embodiments.

As used herein, the terms "receiver device" and "wireless receiver" refer to any one or all of wireless communication devices configured to receive wireless communication signals transmitted by a single-carrier system. Such wireless receivers may include mobile multimedia broadcast receivers, cellular telephones, and similar personal electronic devices which include receiver circuitry capable of demodulating symbols, and a programmable processor and memory.

Significant Doppler spreads make the accurate estimation of wireless channels difficult. Accurate channel estimation is necessary for proper equalization, demodulation, and error performance in both single-carrier and multi-carrier broadcast communication systems. Recently, many channel estimation techniques have been developed to improve accuracy. However, most of these techniques do not take into account side information about the channel being approximately sparse. This is especially true in communication systems used for the propagation of television and data signals, such as systems implementing ATSC (Advanced Television Systems Committee) and ATSC-M/H (Advanced Television Systems Committee-Mobile/Handheld) standards.

To overcome the limitations of current channel estimation methods, the various embodiments provide a channel estimation method based on the theory of compressed sensing/sampling (CS). CS enables the reconstruction of sparse signals from incomplete sets of measurements, thereby providing an appealing alternative to estimation methods based on the classical Shannon-Nyquist sampling theory. An example of a compressed sensing method for channel estimation over a multi-carrier system, such as OFDM, is disclosed in U.S. patent application Ser. No. 12/768,540 entitled "Compressed Sensing Channel Estimation in OFDM Communication Systems" filed Apr. 27, 2010, the entire contents of which are hereby incorporated by reference. The various embodiments provide systems, methods and devices that use CS algorithms to more accurately estimate channels on single-carrier networks.

As discussed above, accurate channel estimation is important for reliable equalization and demodulation in single-carrier transmission systems. The various embodiments utilize CS algorithms to accomplish the challenging task of estimating channels on single-carrier networks having sparse nature. Specifically, the various embodiments use the known predefined (randomly-generated) training sequences in single-carrier modulated signals to improve channel estimation of sparse channels in single-carrier transmission systems.

Figure 1:
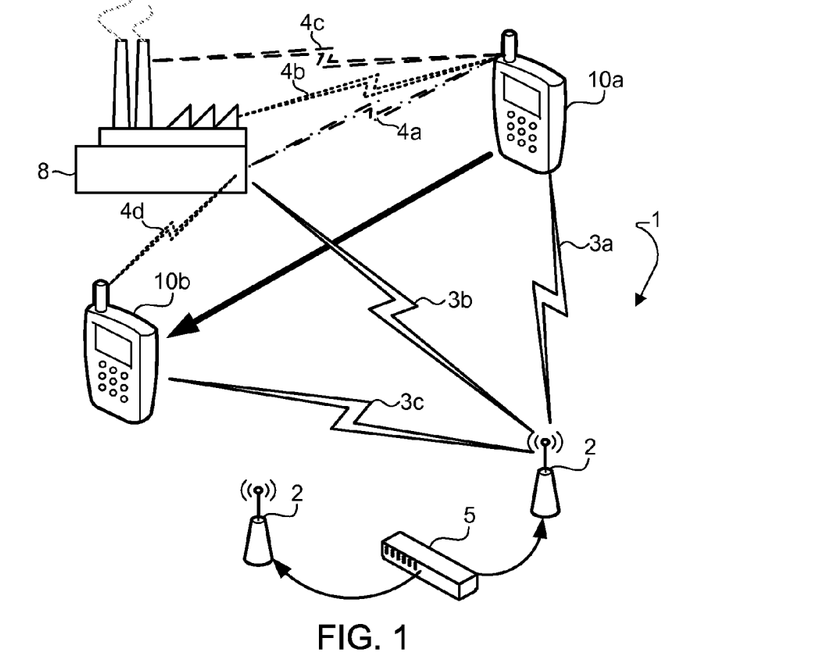
FIG. 1 is a communication system block diagram of a single-carrier communication system.

An example single-carrier communication system is illustrated in FIG. 1. One type of communication system that uses single-carrier transmissions is mobile broadcast television. A mobile broadcast television system 1 may include a plurality of transmission towers 2 connected to a broadcast system 5. The transmission towers 2 broadcast radio frequency signals 3a-3c for reception by wireless receivers 10a, 10b.

FIG. 1 also illustrates the problem of channel fading due to multipath interference. A mobile wireless receiver in one location 10a will typically receive broadcast signals via a direct transmission path 3a between the device and the nearest transmission tower 2. The mobile wireless receiver 10a may also receive several additional signals 4a, 4b, 4c that have traveled via an indirect path ("multipath") such as may be caused by broadcast signals 3b reflected off of mountains, buildings 8, and other structures. In some receiving situations, the wireless receiver 10a may receive only via indirect paths.

Since various multipath signals 4a, 4b, 4c travel different distances, all longer than a direct transmission path, they arrive at the mobile wireless receiver 10a at different times and after the direct transmission path signal 3a. The difference in arrival times among direct- and indirect-path signals is referred to as "delay spread." As result, one or more of the multipath signals 4a, 4b, 4c may destructively interfere with each other and/or with the direct transmission path signal 3a, causing the signal to "fade." Also, delay spread exceeding the sampling rate period introduces frequency-selectivity. When wireless receivers are mobile, such as cellular telephones and mobile television receiver devices, the signal fading conditions may change rapidly as the wireless receiver moves about. This is illustrated by the difference in multipath signals received by a mobile wireless receiver in position 10a compared to the multipath signal 4d received by the mobile wireless receiver when it moves position 10b.

In addition to rapid changes in the multipath signal environment which causes rapid changing in fading characteristics, movement of the mobile device causes frequency shifts due to the Doppler effect in both the direct transmission path signal 3a and the various multipath signals 4a, 4b, 4c, 4d. Since the movement of a wireless receiver 10 with respect to transmission towers 2 and with respect to various reflection sources (e.g., buildings 8) will typically be different due to the different transmission path geometries, the Doppler frequency shift in the direct transmission path signal 3a and in the various multipath signals 4a, 4b, 4c, 4d will typically be different. The difference in Doppler frequency shift among direct path and various multipath signals is referred to as "Doppler spread." The temporal channel variations arising from Doppler spread gives rise to time-selectivity.

The combination of multipath delay and Doppler spread gives rise to time-frequency selectivity, which can cause delay-Doppler fading, or doubly selective fading in channels. Rapidly changing multipath and Doppler spread conditions can complicate the accurate identification and decoding of signals for doubly selective fading channels.

Figure 2:
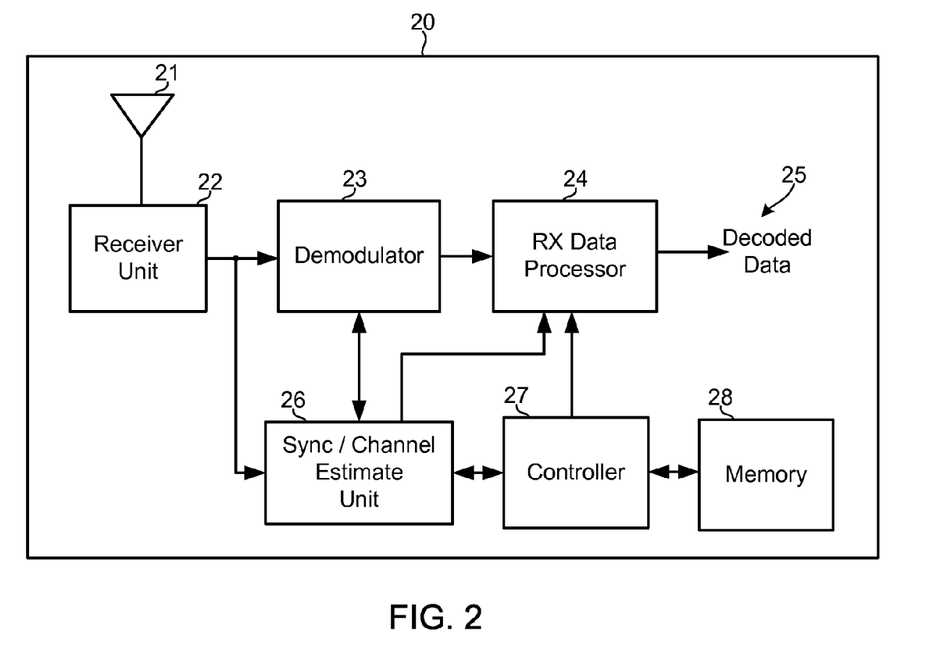
FIG. 2 is a component block diagram of an example wireless receiver device suitable for use with the various embodiments.

The various embodiments may be implemented on a variety of wireless receivers, a block diagram of an example of which is illustrated in FIG. 2. A wireless receiver 20 may be fixed or mobile, and mobile forms may be vehicle born (e.g., within automobiles) or portable units, such as a smart telephone, a portable television receiver, a laptop or smart book computer, a tablet computer, a personal digital assistant (PDA), and so on.

In the wireless receiver 20, transmitted signals from broadcast networks are received by an antenna 21 and provided to a receiver unit 22. The receiver unit 22 conditions (e.g., filters, amplifies, frequency downconverts, etc.) the received signal and digitizes the conditioned signal to obtain a stream of input samples. A demodulator unit 23 performs signal demodulation on the input samples to obtain received data and pilot symbols. The demodulator 23 also performs detection (e.g., matched filtering) on the received data symbols with a channel estimate (e.g., a frequency response estimate) to obtain detected data symbols, which are estimates of the data symbols in the broadcast signal. The demodulator 23 provides the detected data symbols to a receive (RX) data processor 24, which processes (e.g., symbol demaps, deinterleaves, decodes, etc.) the detected data symbols from the demodulator 23 and provide decoded data 25 which may be used by the receiver device 20 to download data, display a television stream, etc.

A synchronization/channel estimation unit (SCEU) 26 may also receive the input samples from the receiver unit 22 and perform synchronization to determine frame and symbol timing using the methods of the various embodiments. The SCEU 26 may also derive the channel estimate using received pilot symbols from the demodulator 23. The SCEU 26 may provide the symbol timing and channel estimate to the demodulator 23, and may provide the frame timing to the RX data processor 24 and/or a controller 27. The demodulator 23 may use the symbol timing to perform demodulation and use the channel estimate to perform detection on the received data symbols. The RX data processor 24 and/or the controller 27 may use the frame timing to recover different types of data transmitted in the broadcast signal. A memory 28 may be coupled to the controller 27 and other components of the wireless receiver 20 for storing data, preliminary results of processing, constants and processor-executable instructions.

The controller 27 may direct the operations performed in the wireless receiver 20. The controller 27 may be a programmable processor configurable with processor-executable instructions, and/or a state machine.

The vast majority of channel estimation algorithms in use in or described in the literature are based on a least-squares (LS)/minimum mean-square error (MMSE) optimization of the uniform samples set.

Most channel estimation methods generally assume a certain signal density, and fail to capitalize on the anticipated sparseness of a channel impulse response. The various embodiments use the signal's anticipated sparseness to circumvent the inherent limitations of Shannon-Nyquist theory, which deals with any arbitrary, bandlimited, possibly dense signal. Thus, the various embodiments cope with high Doppler spreads and large delay spreads by taking a completely different approach to signal analysis compared to the conventional framework of Shannon-Nyquist sampling theory.

As mentioned above, most of the current channel estimation methods use either a frequency-domain (correlation-based) channel estimation technique, or a least-squares channel estimation technique. The various embodiments use a CS channel estimation technique that is much more efficient in terms of computational burden than other (e.g. multi-carrier) channel estimation techniques. An example of a CS channel estimation technique over a multi-carrier network is termed CSCE and disclosed in U.S. patent application Ser. No. 12/768,540 entitled "Compressed Sensing Channel Estimation In OFDM Communication Systems" filed on Apr. 27, 2010, the entire contents of which are hereby incorporated by reference. The various embodiments capitalize on characteristics of single-carrier transmission systems. One such characteristic is the Toeplitz nature of the system model, and consequently, of the sensing matrix. The various embodiments exploit these features to provide improved channel estimation on single-carrier communication systems.

Specifically, the various embodiments capitalize on the observation that the channel impulse response in certain wireless systems is either sparse or approximately sparse. A signal is sparse when the absolute value of only a small fraction of the channel taps actually exceeds a certain low threshold, while the rest of the taps are equal or very close to zero. The various embodiments implement CS algorithms in the SCEU 26 or another processor of a wireless receiver to reconstruct signals from a reduced set of linear measurements utilizing the side information that the signal is sparse or compressible. The various embodiments are especially attractive for reconstructing signals on single-carrier transmission systems due to differences in computational complexity between single-carrier and multi-carrier systems.

Figure 3:
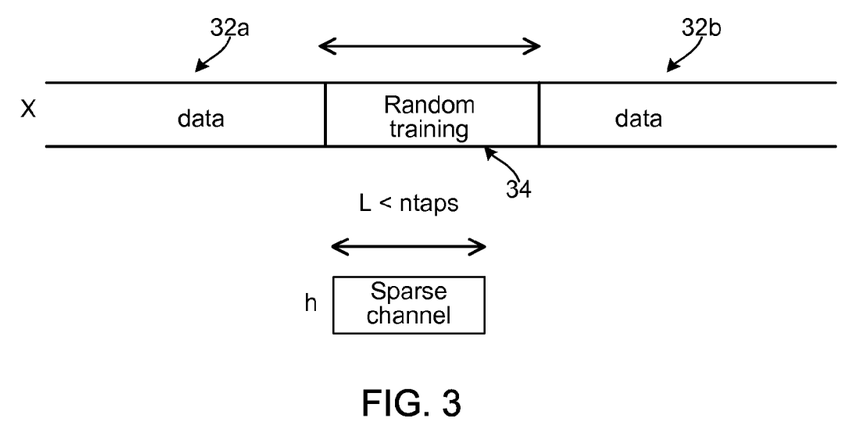
FIG. 3 is an illustration of a communication signal transmitted over a single-carrier transmission system.

A single-carrier transmission is illustrated in FIG. 3. Specifically, FIG. 3 illustrates a single-carrier transmission in which randomized training/pilot symbols 34 are transmitted in between data symbols 32a, 32b. The training/pilot symbols 34 may be predetermined, or generated using a random sequence generator (not shown), and have a length of n symbols. FIG. 3 also illustrates a sparse channel impulse response h having a channel length L.

In situations where the channel length is less than the length of the training sequence (i.e., L<n taps), a noiseless received signal y may be represented by the formula y=x*h where x is the transmitted signal. The convolution operation can be represented in a matrix-vector form by $$y = \begin{bmatrix} y_1 \\ \vdots \\ y_p \end{bmatrix} = \begin{pmatrix} x_L & \cdots & x_1 \\ \vdots & \ddots & \vdots \\ x_n & \cdots & x_p \end{pmatrix} \begin{bmatrix} h_1 \\ \vdots \\ h_L \end{bmatrix} = Xh,$$

where p is the number of channel output samples. For example, in an implementation of the ATSC-M/H standard for mobile DTV, a known training sequence (TR1) may be of length n=1424 symbols, and a maximal channel length may be $L=2^{10}=1024<n$ symbols. In this example, there are, at most, p=n−L+1 (e.g., p=1424−1024+1=401) symbols which are dispersed, or contaminated, only by preceding known training symbols (e.g., the last 401 symbols of TR1).

Using CS, the above-mentioned de-convolution problem can be accomplished by minimizing $$\min_h \|h\|_{l1} \text{ subject to } y=Xh,$$

where $$\|v\|_{l1} = \Sigma |v_i|.$$

This convex optimization problem can be solved using standard methods such as GPSR (gradient projection for sparse reconstruction). Based on this and other observations, the various embodiments utilize CS to achieve superior channel estimation in single-carrier systems, such as ATSC and/or ATSC-M/H.

The various embodiments exploit the Toepleitz characteristics of the sensing matrix to determine the complexity of CS reconstruction. This allows the various embodiments to substantially reduce the computational burden required of the devices. Reducing the computation burden improves both the accuracy and the efficiency of the channel estimation process.

Generally, the complexity of CS reconstruction may be determined in a matrix-vector operation X·z, where X is the sensing matrix and z is an arbitrary (not necessarily sparse) L×1 vector. Applying this to the ATSC-M/H example above, the complexity of the CS reconstruction may be O(pL)~O(400K). However, as may be observed above, in the ATSC-M/H problem X is a partial Toeplitz matrix. Therefore, the same product can be implemented by solving O(2 L log₂ 2 L)=O(20K), making the computation much more feasible. The various embodiments exploit these characteristics to substantially reduce the computational burden enabling the methods to be implemented in the SCEU 26 or another processor of a wireless receiver.

This reduction in computational burden may be explained as follows: the p×L partial Toeplitz matrix, X, can be first extended to a L×L full Toeplitz matrix, T, where $$T = \begin{bmatrix} x_p & \cdots & x_1 & \cdots & 0 \\ \vdots & & & \ddots & \vdots \\ \vdots & & & & x_1 \\ \vdots & & & & \vdots \\ x_n & \cdots & \cdots & \cdots & x_p \end{bmatrix}.$$

Then, T may be further extended to an 2 L×2 L circulant matrix, C $$C = \begin{bmatrix} T & B \\ B & T \end{bmatrix} \begin{bmatrix} z \\ 0 \end{bmatrix} = \begin{bmatrix} \dagger_{(L-p)} \\ X \cdot z \\ \dagger_L \end{bmatrix},$$

where B is the L×L complementary matrix $$B = \begin{bmatrix} 0 & x_n & \cdots & \cdots & x_{p+1} \\ \vdots & \ddots & & \ddots & \vdots \\ x_1 & & \ddots & & \vdots \\ \vdots & \ddots & & \ddots & x_n \\ x_{p-1} & \cdots & x_1 & \cdots & 0 \end{bmatrix}.$$

The singular value decomposition (SVD) of the circulant matrix, C, yields F'ΛF, where F is the discrete Fourier transform (DFT) matrix, F' is the inverse discrete Fourier transform (IDFT) matrix and Λ is the diagonal eigenvalue matrix of C. The F and F' operations can be implemented efficiently in the SCEU 26 (or another processor) via a fast Fourier transform (FFT) operation and an inverse fast Fourier transform (IFFT) operation, respectively. The matrix Λ can also be computed using a FFT over the first column of C.

In various embodiments, the same sensing matrix X is multiplied with different vectors during the CS process within the SCEU 26 or another processor of a wireless receiver. Hence Λ is only required to be calculated once per sensing matrix. In various embodiments, after performing a 2L (2K in the example) FFT, multiplying by Λ, and another 2L (2K) IFFT, the SCEU 26 may take the L−p+1 up to L entries of the 2L length result vector, which is identical to the result of the direct O(pL) multiplication. In these embodiments, the computational complexity of CS may be comparable to that of the traditional frequency-domain, correlation-based, and least-squares channel estimation methods.

The various embodiments exploit knowledge about the inherent sparsity of the scattering channel for improved channel impulse response estimation. The channel impulse response estimation achieved by the various embodiments is superior to other methods of channel estimation, which do not take into account this prior knowledge of channel characteristics. Further, the various embodiments implement the CS algorithm in a manner that capitalizes on the characteristics of single-carrier transmission systems. Unlike systems that implement a compressed sensing algorithm on multi-carrier systems, the CS algorithms used by the various embodiments do not require recasting the signal from the traditional time-frequency domain into the delay-Doppler domain. This may be a significant advantage, as it supports a more accurate, efficient, and cost-effective implementation of channel estimation.

Figure 4:
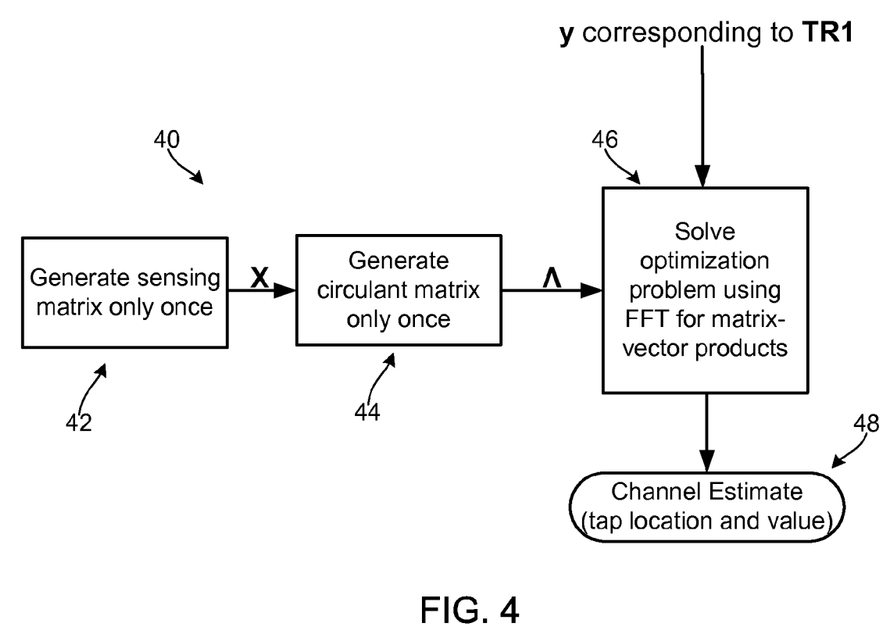
FIG. 4 is a process flow diagram of an embodiment method for calculating a channel estimate using compressed sensing

FIG. 4 illustrates an embodiment CS channel estimation algorithm method 40 that may be accomplished in an SCEU 26 (or another processor) by extracting the sparse channel impulse response and applying the compressed sensing technique. In method 40 at block 42, a sensing matrix X may be generated. As mentioned above, the embodiments may generate this sensing matrix X only once. At block 44, the sensing matrix X may be used by an SCEU 26 to generate a circulant matrix C and the diagonal eigenvalue matrix of C, Λ. The same sensing matrix X may be multiplied with different vectors during the CS process within an SCEU 26. Hence Λ is only required to be calculated once per sensing matrix. At block 46, the matrix Λ may be combined with a noiseless received signal y corresponding to a known training sequence (e.g., TR1), to solve an optimization problem using a fast Fourier transform (FFT) operation for matrix-vector products. The results of block 46 may then be used by an SCEU 26 to generate a channel estimate, identifying tap locations and values.

As discussed above, the complexity of CS reconstruction may be determined using a matrix-vector operation Xz, where X is the sensing matrix and z is an arbitrary (not necessarily sparse) L×1 vector. In single-carrier transmissions where X is a partial Toeplitz matrix, the same product can be implemented by solving $O(2 L \log_2 2 L)$, making the computation much more feasible.

As discussed above, in various embodiments, after performing a 2 L FFT, multiplying by $\Lambda$, and another 2 L IFFT, the L−p+1 is taken up to L entries of the 2 L length result vector, which is identical to the result of the direct O(pL) multiplication. In these embodiments, the computational complexity of CS may be comparable to that of the traditional frequency-domain, correlation-based, and least-squares channel estimation methods.

The various embodiments may be implemented on a wide variety of wireless receivers. Typical wireless receivers 70 suitable for use with the various embodiments will have in common the components described above with reference to FIG. 2 and illustrated in FIG. 5. For example, an exemplary wireless receiver 70 may include a processor 71 coupled to internal memory 72, a speaker 79, and a display, such as a touchscreen display 73. Additionally, the wireless receiver 70 may have an antenna 74 for receiving electromagnetic radiation that is connected to a wireless data link transceiver 75 coupled to the processor 71. Wireless receivers 70 typically also include one or more keys 76 for receiving user inputs.

Figure 5:
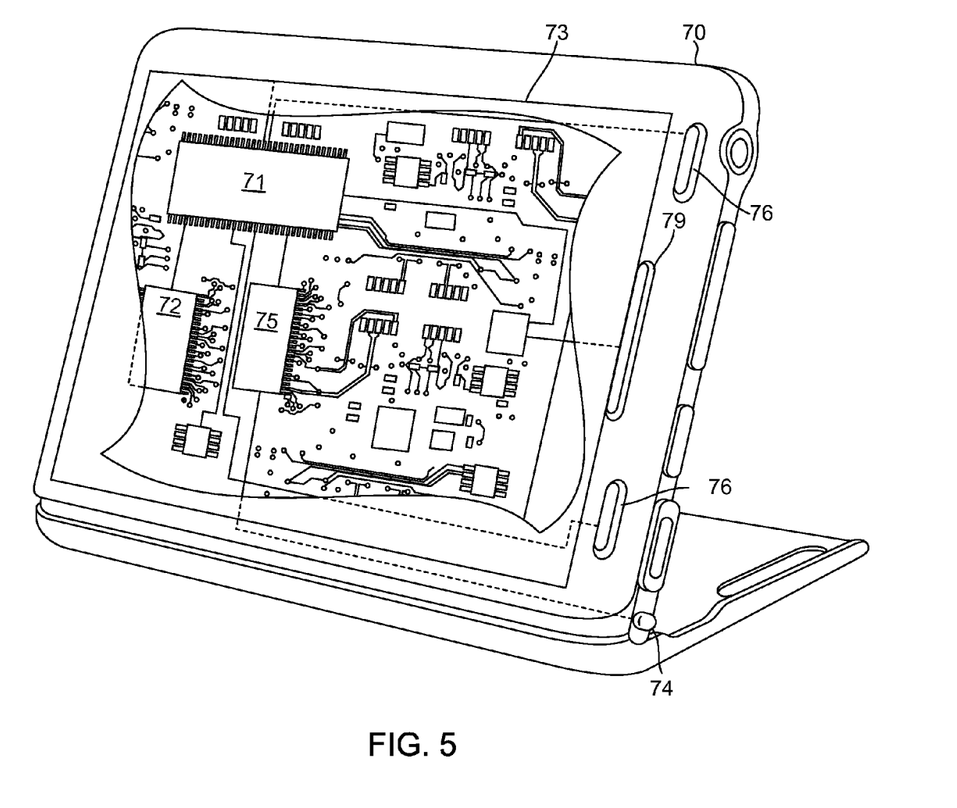
FIG. 5 is an illustration of a wireless receiver suitable for use in an embodiment.

The processor 71 may be any programmable microprocessor, microcomputer or multiple processor chip or chips that can be configured by software instructions (applications) to perform a variety of functions, including the functions of the various embodiments described herein. In some mobile devices, multiple processors 71 may be provided, such as one processor dedicated to wireless communication functions and one processor dedicated to running other applications. Typically, software applications may be stored in the internal memory 72 before they are accessed and loaded into the processor 71. In some mobile devices, the processor 71 may include internal memory sufficient to store the application software instructions. In many wireless receivers 70, the internal memory 72 may be a volatile or nonvolatile memory, such as flash memory, or a mixture of both. For the purposes of this description, a general reference to memory refers to all memory accessible by the processor 71, including internal memory 72, removable memory plugged into the wireless receiver 70, and memory within the processor 71 itself.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for receiving a wireless signal transmitted over a single-carrier transmission, comprising:
    deriving a channel impulse response using the wireless signal;
    applying a compressed sensing algorithm, by one or more processors, to the derived channel impulse response to obtain a channel estimate; and
    reconstructing the wireless signal using the channel estimate, wherein the wireless signal comprises predetermined randomly-generated training symbols transmitted in between a plurality of data symbol sets, and
    wherein the compressed sensing algorithm comprises:
    generating a sensing matrix, the sensing matrix being a partial Toeplitz matrix;
    generating a circulant matrix from the generated sensing matrix;
    generating a diagonal eigenvalue matrix from the generated circulant matrix; and
    combining the predetermined randomly-generated training symbols with the generated diagonal eigenvalue matrix to obtain the channel estimate.

2. The method of claim 1, wherein the compressed sensing algorithm comprises:
    generating exactly one diagonal eigenvalue matrix from the generated circulant matrix.

3. The method of claim 1, wherein the derived channel impulse response is approximately sparse.

4. The method of claim 1, wherein the diagonal eigenvalue matrix is generated by executing a fast Fourier transform operation over a first column of the generated circulant matrix.

5. The method of claim 1, wherein the compressed sensing algorithm is computationally comparable to that of a least squares or a correlation based channel estimation method.

6. A wireless receiver device for receiving a wireless signal transmitted over a single-carrier transmission, the wireless receiver device comprising:
    means for deriving a channel impulse response using the wireless signal;
    means for applying a compressed sensing algorithm to the derived channel impulse response to obtain a channel estimate; and
    means for reconstructing the wireless signal using the channel estimate,
    wherein the wireless signal comprises predetermined randomly-generated training symbols transmitted in between a plurality of data symbol sets, and wherein the means for applying a compressed sensing algorithm comprises:
    means for generating a sensing matrix, the sensing matrix being a partial Toeplitz matrix;
    means for generating a circulant matrix from the generated sensing matrix;
    means for generating a diagonal eigenvalue matrix from the generated circulant matrix; and
    means for combining the predetermined randomly-generated training symbols with the generated diagonal eigenvalue matrix to obtain the channel estimate.

7. The wireless receiver device of claim 6, wherein the means for applying a compressed sensing algorithm comprises:
    means for generating exactly one diagonal eigenvalue matrix from the generated circulant matrix.

8. The wireless receiver device of claim 6, wherein the derived channel impulse response is approximately sparse.

9. The wireless receiver device of claim 6, wherein means for generating a diagonal eigenvalue matrix comprises means for executing a fast Fourier transform operation over a first column of the generated circulant matrix.

10. The wireless receiver device of claim 6, wherein the compressed sensing algorithm is computationally comparable to that of a least squares or a correlation based channel estimation method.

11. A wireless receiver device for receiving a wireless signal transmitted over a single-carrier transmission, comprising:
    a memory; and
    a processor coupled to the memory, wherein the processor is configured with processor-executable software instructions to perform operations comprising:
        deriving a channel impulse response using the wireless signal;
        applying a compressed sensing algorithm to the derived channel impulse response to obtain a channel estimate; and
        reconstructing the wireless signal using the channel estimate,
    wherein the processor is configured with processor-executable software instructions to perform operations such that the channel impulse response is derived from a wireless signal including predetermined randomly-generated training symbols transmitted in between a plurality of data symbol sets, and with processor-executable software instructions to perform operations such that the compressed sensing algorithm comprises:
        generating a sensing matrix, the sensing matrix being a partial Toeplitz matrix;
        generating a circulant matrix from the generated sensing matrix;
        generating a diagonal eigenvalue matrix from the generated circulant matrix; and combining the predetermined randomly-generated training symbols with the generated diagonal eigenvalue matrix to obtain the channel estimate.

12. The wireless receiver device of claim 11, wherein the processor is configured with processor-executable software instructions to perform operations such that the compressed sensing algorithm comprises: generating exactly one diagonal eigenvalue matrix from the generated circulant matrix.

13. The wireless receiver device of claim 11, wherein the processor is configured with processor-executable software instructions to perform operations such that the derived channel impulse response is approximately sparse.

14. The wireless receiver device of claim 11, wherein the processor is configured with processor-executable software instructions to perform operations such that the diagonal eigenvalue matrix is generated by executing a fast Fourier transform operation over a first column of the generated circulant matrix.

15. The wireless receiver device of claim 11, wherein the processor is configured with processor-executable software instructions to perform operations such that the compressed sensing algorithm is computationally comparable to that of a least squares or a correlation based channel estimation method.

16. A non-transitory processor-readable storage medium having stored thereon processor-executable software instructions configured to cause a wireless receiver device processor to perform operations comprising:
   deriving a channel impulse response using the wireless signal;
   applying a compressed sensing algorithm to the derived channel impulse response to obtain a channel estimate; and
   reconstructing the wireless signal using the channel estimate,
   wherein the stored processor-executable software instructions are further configured to cause the processor to perform operations such that the channel impulse response is derived from a single-carrier wireless signal including predetermined randomly-generated training symbols transmitted in between a plurality of data symbol sets, and to cause the processor to perform operations such that the compressed sensing algorithm comprises:
   generating a sensing matrix, the sensing matrix being a partial Toeplitz matrix;
   generating a circulant matrix from the generated sensing matrix; and
   generating a diagonal eigenvalue matrix from the generated circulant matrix; and
   combining the predetermined randomly-generated training symbols with the generated diagonal eigenvalue matrix to obtain the channel estimate.

17. The non-transitory processor-readable storage medium of claim 16, wherein the stored processor-executable software instructions are configured to cause the processor to perform operations such that the compressed sensing algorithm comprises:
   generating exactly one diagonal eigenvalue matrix from the generated circulant matrix.

18. The non-transitory processor-readable storage medium of claim 16, wherein the stored processor-executable software instructions are configured to cause the processor to perform operations such that the derived channel impulse response is approximately sparse.

19. The non-transitory processor-readable storage medium of claim 16, wherein the stored processor-executable software instructions are further configured to cause the processor to perform operations such that the diagonal eigenvalue matrix is generated by executing a fast Fourier transform operation over a first column of the generated circulant matrix.

20. The non-transitory processor-readable storage medium of claim 16, wherein the stored processor-executable software instructions are configured to cause the processor to perform operations such that the compressed sensing algorithm is computationally comparable to that of a least squares or a correlation based channel estimation method.

* * * * *